(12) United States Patent
Hindi et al.

(10) Patent No.: US 10,144,786 B2
(45) Date of Patent: Dec. 4, 2018

(54) METHOD OF MAKING NANOCRYSTALLINE CELLULOSE

(71) Applicant: KING ABDULAZIZ UNIVERSITY, Jeddah (SA)

(72) Inventors: Sherif Shawki Zaki Hindi, Jeddah (SA); Refaat Atalla Abohassan, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 15/092,589

(22) Filed: Apr. 6, 2016

(65) Prior Publication Data

US 2017/0291962 A1    Oct. 12, 2017

(51) Int. Cl.
| | |
|---|---|
| *C08B 15/00* | (2006.01) |
| *C08B 15/02* | (2006.01) |
| *B05D 3/00* | (2006.01) |
| *C08L 1/02* | (2006.01) |
| *C08B 1/00* | (2006.01) |

(52) U.S. Cl.
CPC .............. *C08B 15/00* (2013.01); *C08B 15/02* (2013.01); *B05D 3/00* (2013.01); *C08B 1/00* (2013.01); *C08L 1/02* (2013.01)

(58) Field of Classification Search
CPC .. C08B 15/02; C08B 1/00; C08L 1/02; B05D 3/00
USPC ....................................................... 536/56
See application file for complete search history.

(56) References Cited

U.S. PATENT DOCUMENTS

| | | | | |
|---|---|---|---|---|
| 2,234,307 | A * | 3/1941 | Kantorowicz | D06M 15/05 106/203.1 |
| 8,652,636 | B2 | 2/2014 | Beck et al. | |
| 8,709,203 | B2 | 4/2014 | Jemaa et al. | |
| 8,710,213 | B2 | 4/2014 | Zhu et al. | |
| 8,722,092 | B2 | 5/2014 | Nachtkamp et al. | |
| 8,758,496 | B2 | 6/2014 | Beck et al. | |
| 9,109,195 | B2 * | 8/2015 | Zimmermann | C12M 35/00 |

FOREIGN PATENT DOCUMENTS

| | | |
|---|---|---|
| CN | 102690358 A | 9/2012 |
| WO | WO 2014/070092 A1 | 5/2014 |

OTHER PUBLICATIONS

Liu et al ("Structure and rheology of nanocrystalline cellulose", Carbohydrate Polymers 84 (2011), pp. 316-322).*
Hamad et al., "Structure-Process-Yield Interrelations in Nanocrystalline Cellulose Extraction," The Canadian Journal of Chemical Engineering, 88(3), 392-402, Jun. 2010.
Peng et al., "Chemistry and Applications of Nanocrystalline Cellulose and Its Derivatives: A Nanotechnology Perspective," The Canadian Journal of Chemical Engineering, 89(5), 1191-1206, Oct. 2011.
Lu et al., "Preparation and Characterization of Cellulose Nanocrystals from Rice Straw," Carbohydrate Polymers, 87(1), 564-573, Jan. 4, 2012.
Mariano et al., "Cellulose Nanocrystals and Related Nanocomposites: Review of some Properties and Challenges," Journal of Polymer Science Part B: Polymer Physics, 52(12), 791-806, Jun. 15, 2014.

* cited by examiner

*Primary Examiner* — Shaojia A Jiang
*Assistant Examiner* — Everett White
(74) *Attorney, Agent, or Firm* — Richard C. Litman

(57) ABSTRACT

The method of making nanocrystalline cellulose is a flash lyophilized-acidic hydrolysis method for converting cellulosic fibers into nanocrystalline cellulose. Cellulosic fibers are initially ground in a high-speed, rotary grinder to produce ground cellulose fiber. The ground cellulose fiber is then dried to produce dried, ground cellulose, which is then freeze-dried to yield lyophilized cellulose. Pure concentrated sulfuric acid is then added to the lyophilized cellulose at a liquid/solid ratio of 1:1 (vol/wt) to form a cellulosic paste. The cellulosic paste is diluted in either water or absolute ethanol at a liquid/solid ratio of 1:1 (vol/wt) to form a cellulosic solution, which is then filtered under cooling by liquid nitrogen-vapor. The nanocrystalline cellulose precipitate is then washed until neutralization and dried to yield nanocrystalline cellulose.

2 Claims, 5 Drawing Sheets

METHOD OF MAKING NANOCRYSTALLINE CELLULOSE

BACKGROUND OF THE INVENTION

1. Field of the Invention

The present invention relates to the manufacture of nanocrystalline cellulose, and particularly to a flash lyophilized-acidic hydrolysis method for converting cellulosic fibers into nanocrystalline cellulose.

2. Description of the Related Art

Cellulose $(C_6H_{10}O_5)_n$ is an organic polysaccharide formed as a linear chain of hundreds to thousands of β(1→4) linked D-glucose units. Cellulose is an important structural component of the primary cell wall of green plants, many forms of algae and the oomycetes. Additionally, some species of bacteria secrete it to form biofilms. Thus, cellulose is the most abundant organic polymer on Earth. In biosynthesis, cellulose polymers aggregate to form substructures, known as "microfibrils", which, in turn, aggregate to form cellulose fibers. By applying effective methods, these fibers can be disintegrated into cellulose substructures with micro- or nano-size dimensions. Since cellulose consists of crystalline and amorphous regions, treating cellulose with strong acid allows the amorphous regions to be broken up, thereby producing nanocrystalline cellulose (also referred to as "nanocellulose").

Nanocellulose is typically obtained from native fibers by an acid hydrolysis, giving rise to highly crystalline and rigid nanoparticles (often referred to as "nanowhiskers"), which are shorter (on the order of 100 to 1000 nanometers) than the nanofibrils obtained through homogenization, microfluidization or grinding routes. The resultant material, nanocrystalline cellulose (NCC), has a wide variety of uses, including, but not limited to, industrial paper and paperboard manufacture, composite materials (such as plastic reinforcement, for example), foods, hygiene and absorbent products, emulsion and dispersant products, oil recovery, medical, cosmetic and pharmaceutical products, solvents, tobacco additives, and high-flux membranes. Given the vast number of uses of nanocrystalline cellulose, as well as its environmentally friendly nature, it would be desirable to provide a method of manufacturing nanocrystalline cellulose on an industrial scale, which is quicker, more efficient and cheaper than traditional acid hydrolysis.

Thus, a method of making nanocrystalline cellulose solving the aforementioned problems is desired.

SUMMARY OF THE INVENTION

The method of making nanocrystalline cellulose is a flash lyophilized-acidic hydrolysis method for converting cellulosic fibers into nanocrystalline cellulose. Cellulosic fibers are initially ground in a high-speed, rotary grinder to produce ground cellulose fiber. The ground cellulose fiber is then dried to produce dried, ground cellulose, which is then freeze-dried to yield lyophilized cellulose. Pure concentrated sulfuric acid is then added to the lyophilized cellulose at a liquid/solid ratio of 1:1 (vol/wt) to form a cellulosic paste. The cellulosic paste is diluted in either cold water or absolute ethanol at a liquid/solid ratio of 1:1 (vol/wt) to form a cellulosic solution, which is then filtered under cooling by liquid nitrogen-vapor. The nanocrystalline cellulose precipitate is then washed in either cold water or ethanol until neutralization, and then dried to yield nanocrystalline cellulose.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The method of making nanocrystalline cellulose is a flash lyophilized-acidic hydrolysis method for converting cellulosic fibers into nanocrystalline cellulose. Cellulosic fibers may be initially ground in a high-speed, rotary grinder to produce ground cellulose fiber, although it should be understood that any suitable grinding method may be utilized. The ground cellulose fiber is preferably size selected by sieving through a 40 mesh sieve and retention on a 60 mesh sieve. The size-selected ground cellulose fiber is then dried to produce dried, ground cellulose, which is then freeze-dried to yield lyophilized cellulose. Drying is preferably performed by oven drying the size-selected ground cellulose fiber at a temperature of 105° C.±5° C. for approximately two hours, and then holding the dried, ground cellulose fiber with a desiccant for approximately 30 minutes, until heat balance with the surrounding atmosphere is obtained, although it should be understood that any suitable method of drying may be utilized. Freeze-drying is performed by exposure of the dried, ground cellulose fiber to cold liquid nitrogen-vapor for approximately five minutes. Approximately 50 mL of the liquid nitrogen is poured over approximately 10 g of the dried, ground cellulose fiber in a beaker. It should be understood that any suitable freeze-drying process may be used.

Following evaporation of the liquid nitrogen, an acid, such as pure concentrated sulfuric acid (≥98.06%), is poured directly over the lyophilized cellulose at a liquid/solid ratio of 1:1 (vol/wt) to form a cellulosic paste. It should be noted that in conventional prior art hydrolysis methods of manufacturing nanocrystalline cellulose, the hydrolyzing solution to cellulose ratio is 8:1. Mechanical stirring is performed on the sulfuric acid and lyophilized cellulose to ensure good mixing between the ground fibers and the acid, as well as obtaining complete penetration of the acid into all interior pores of the cellullosic tissues.

The cellulosic paste is then diluted in either water or absolute ethanol at a liquid/solid ratio of 1:1 (vol/wt) to form a cellulosic solution. The cellulosic solution is filtered, for example, with a Gooch crucible filter using a vacuum pump, under cooling by liquid nitrogen-vapor, and then the nanocrystalline cellulose precipitate is washed in either cold water or ethanol until neutralization. Then, droplets of the resultant filtered solution are air dried on a glass slide for approximately one hour, yielding the resultant nanocrystalline cellulose. It should, however, be understood that any suitable type of filtering and drying may be utilized.

Figure 1A:
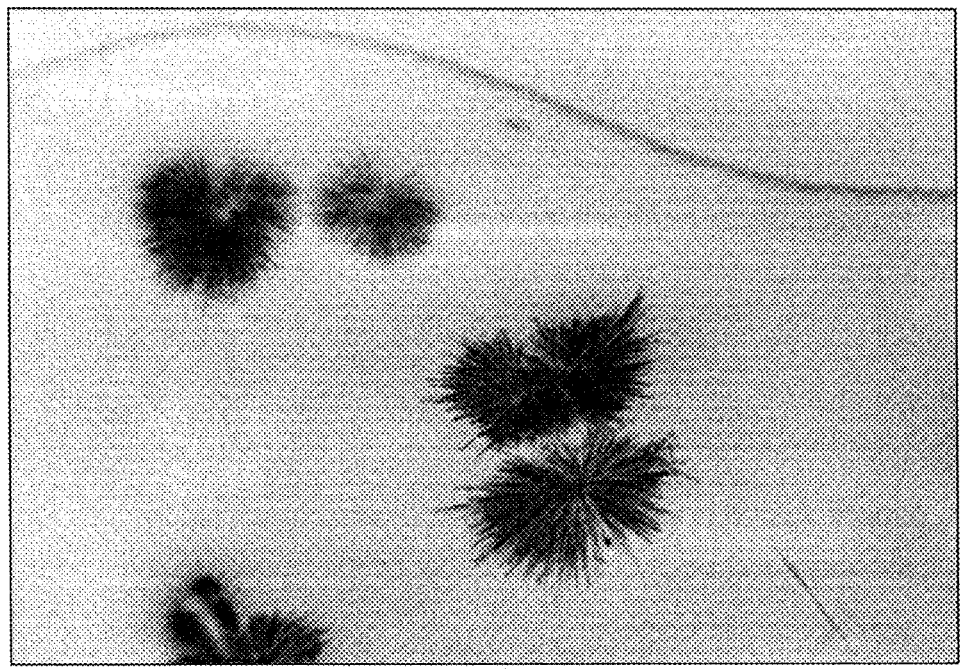
FIG. 1A is an optical microscope image (4× magnification) of nanocrystalline cellulose based micro-crystalline urchins produced by the method of making nanocrystalline cellulose according to the present invention.
Figure 1B:
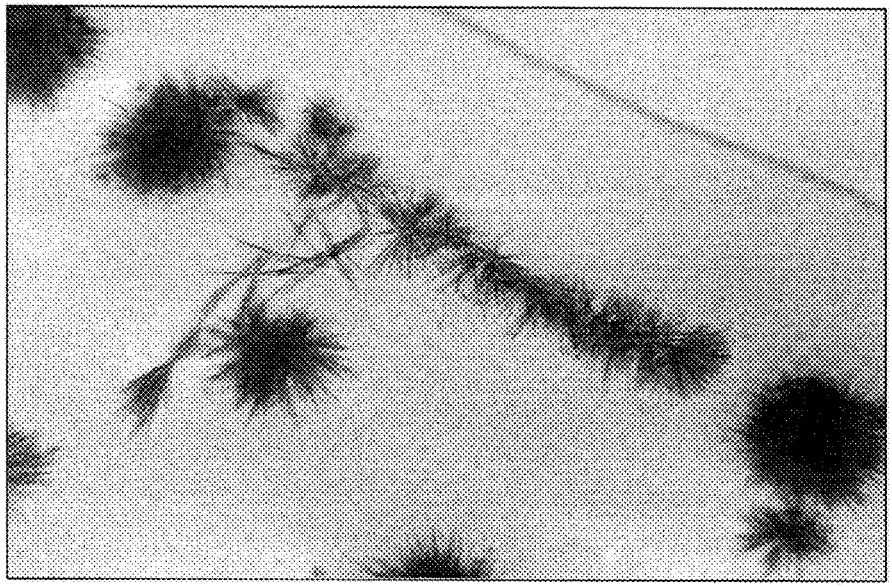
FIG. 1B is an optical microscope image (4× magnification) of extending growth of nanocrystalline cellulose produced by the method of making nanocrystalline cellulose based micro-crystalline urchins according to the present invention.
Figure 2:
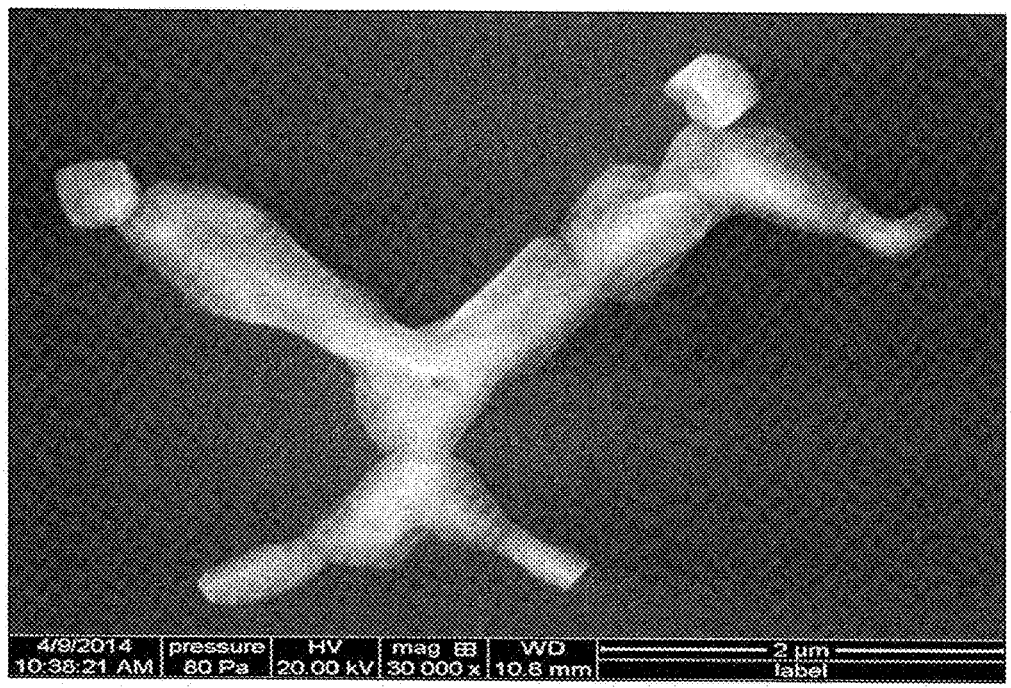
FIG. 2 is a scanning electron micrograph of nanocrystalline cellulose based micro-crystalline connectors produced by the method of making nanocrystalline cellulose according to the present invention.
Figure 3:
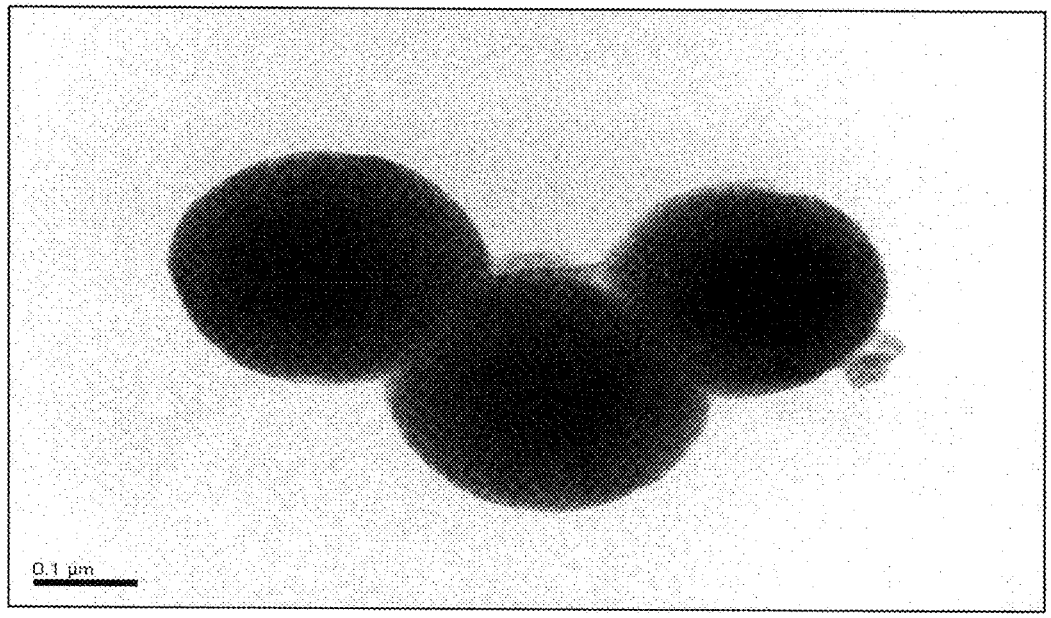
FIG. 3 is a transmission electron micrograph of aggregates of nanocrystalline cellulose produced by the method of making nanocrystalline cellulose according to the present invention.
Figure 4:
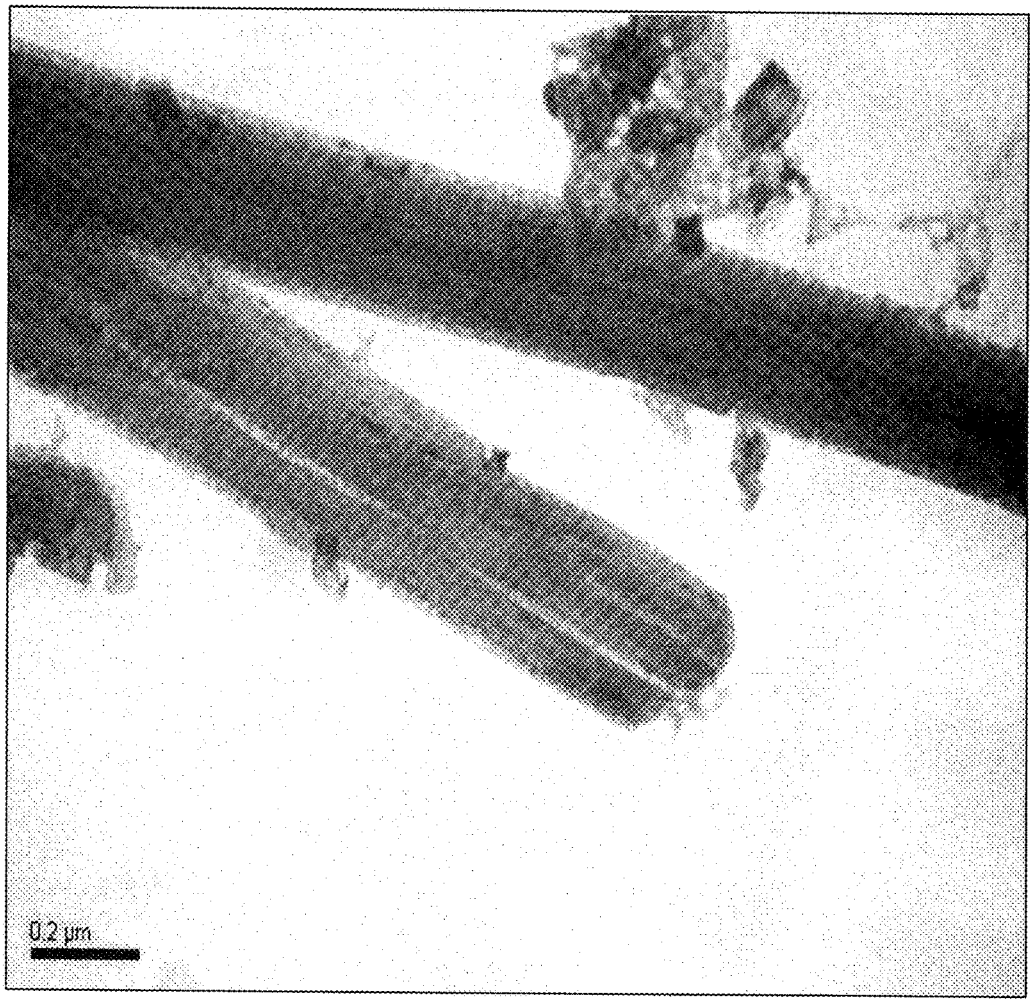
FIG. 4 is a transmission electron micrograph of crystal growth on nanocrystalline cellulose needles produced by the method of making nanocrystalline cellulose according to the present invention.

FIGS. 1A and 1B show optical microscope images (4× magnification) of nanocrystalline cellulose produced by the present method of making nanocrystalline cellulose, with the initial cellulose source being recovered cellulose from recycled writing paper. It can be clearly seen that the needles or "whiskers" of nanocrystalline cellulose are shorter and more abundant than those produced by conventional, prior art techniques. FIG. 2 is a scanning electron micrograph of nanocrystalline cellulose produced by the present method of making nanocrystalline cellulose, and FIG. 3 is a transmission electron micrograph showing three aggregates of nanocrystalline cellulose formed by the method of making nanocrystalline cellulose. FIG. 4 is a transmission electron micrograph showing crystal growth on nanocrystalline cellulose needles produced by the present method of making nanocrystalline cellulose.

It is to be understood that the present invention is not limited to the embodiments described above, but encompasses any and all embodiments within the scope of the following claims.

We claim:

1. A method of making nanocrystalline cellulose, consisting of the sequential steps of:
   grinding cellulosic fibers to produce ground cellulose fiber;
   drying the ground cellulose fiber to produce dried, ground cellulose, wherein the drying is done at about 105° C. for two hours;
   freeze-drying the dried, ground cellulose by exposing the dried, ground cellulose to liquid nitrogen-vapor for five minutes to produce lyophilized cellulose;
   adding at least 98.06% pure sulfuric acid to the lyophilized cellulose at a liquid/solid ratio of 1:1 (vol/wt) and stirring to form a cellulosic paste;
   diluting the cellulose paste in a cold liquid at a liquid/solid ratio of 1:1 (vol/wt) to form a cellulosic solution, wherein the cold liquid is selected from the group consisting of water and absolute ethanol;
   filtering the cellulosic solution under cooling by liquid nitrogen-vapor to produce a nanocrystalline cellulose precipitate;
   washing the nanocrystalline cellulose precipitate until neutralization, wherein the washing is performed in a liquid selected from the group consisting of cold water and ethanol; and
   air-drying the washed nanocrystalline cellulose precipitate for one hour to yield a nanocrystalline cellulose product, wherein the cellulose product comprises cellulose needles configured as whiskers.

2. The method of making nanocrystalline cellulose as recited in claim 1, wherein the step of drying the ground cellulose fiber further comprises desiccating the ground cellulose fiber.

* * * * *